US010879571B2

(12) United States Patent
Saito et al.

(10) Patent No.: US 10,879,571 B2
(45) Date of Patent: Dec. 29, 2020

(54) WIRE CONNECTION BUS BAR AND CONDUCTIVE MODULE

(71) Applicant: Yazaki Corporation, Tokyo (JP)

(72) Inventors: Kazuaki Saito, Shizuoka (JP); Kazuhiro Naito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 145 days.

(21) Appl. No.: 16/011,492

(22) Filed: Jun. 18, 2018

(65) Prior Publication Data

US 2018/0366790 A1 Dec. 20, 2018

(30) Foreign Application Priority Data

Jun. 20, 2017 (JP) .................................. 2017-120546

(51) Int. Cl.

| | |
|---|---|
| *H01M 4/02* | (2006.01) |
| *H01M 10/48* | (2006.01) |
| *H01M 10/42* | (2006.01) |
| *H01M 2/20* | (2006.01) |
| *H02B 1/20* | (2006.01) |
| *H01M 2/26* | (2006.01) |
| *H01R 11/28* | (2006.01) |
| *H01R 4/18* | (2006.01) |

(52) U.S. Cl.
CPC ......... *H01M 10/482* (2013.01); *H01M 2/206* (2013.01); *H01M 2/266* (2013.01); *H01M 10/4257* (2013.01); *H02B 1/20* (2013.01); *H01M 2010/4271* (2013.01); *H01M 2220/20* (2013.01); *H01R 4/185* (2013.01); *H01R 11/288* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 2015/0372354 A1* | 12/2015 | Nakano | H01M 2/206 429/90 |
| 2016/0248128 A1 | 8/2016 | Mukasa et al. | |
| 2017/0125956 A1 | 5/2017 | Kato | |
| 2018/0261953 A1* | 9/2018 | Takahashi | H01G 2/04 |

FOREIGN PATENT DOCUMENTS

| | | | |
|---|---|---|---|
| JP | 2015-88426 A | | 5/2015 |
| JP | 2017-92030 A | | 5/2017 |
| WO | WO 2017-047372 | * | 3/2017 |
| WO | 2017/047372 A1 | | 4/2018 |

* cited by examiner

*Primary Examiner* — Jacob B Marks
(74) *Attorney, Agent, or Firm* — Kenealy Vaidya LLP

(57) ABSTRACT

A wire connection bus bar includes a bus bar member that includes a flat plate-shaped bus bar main body electrically connected to an electrode terminal, an arm body that is a part extending from the bus bar main body in a direction crossing a reference plane of the bus bar main body and has an electrical connection portion to which a first terminal portion is physically and electrically connected, and at least one protruding body protruding from the bus bar main body in the direction crossing the reference plane, and the protruding body is formed such that a protruding amount from the reference plane in an orthogonal direction with respect to the reference plane is equal to or larger than a maximum protruding amount from the reference plane of a connection body, formed of the arm body and a connecting terminal, in the orthogonal direction.

8 Claims, 8 Drawing Sheets

WIRE CONNECTION BUS BAR AND CONDUCTIVE MODULE

CROSS-REFERENCE TO RELATED APPLICATION(S)

The present application claims priority to and incorporates by reference the entire contents of Japanese Patent Application No. 2017-120546 filed in Japan on Jun. 20, 2017.

BACKGROUND OF THE INVENTION

1. Field of the Invention

The present invention relates to a wire connection bus bar and a conductive module.

2. Description of the Related Art

Conventionally, in vehicles such as electric automobiles and hybrid cars, a battery pack for supplying electric power to a rotary machine as a driving source thereof is mounted. Further, the battery pack is provided with a battery module in which a plurality of battery cells each of which has positive and negative electrode terminals are arranged and a conductive module that is electrically connected to at least one electrode terminal of the battery module. The conductive module includes a conductive bus bar member electrically connected to the electrode terminal, am electric wire electrically connected to each of the bus bar member and an electrical connection target, and a housing member housing the bus bar member and the electric wire. For example, the bus bar member and the electric wire are electrically connected via a conductive connecting terminal that connects the bus bar member and the electric wire to each other. Here, the bus bar member and the connecting terminal are integrated, thereby forming a conductor (hereinafter referred to as a "wire connection bus bar") which can be electrically connected not only to the electrode terminal but also to the electric wire. This type of conductive module is disclosed in Japanese Patent Application Laid-open No. 2015-88426.

Meanwhile, it is also possible to form a connecting terminal separate from a bus bar member such that the electric wire is connected in the state of being assembled to the bus bar member, and conversely, the connecting terminal can be also formed to be connected to the electric wire and then assembled to the bus bar member. For example, in the former case, the flat plate-shaped bus bar member and the connecting terminal are assembled to form the wire connection bus bar. For example, a plurality of the wire connection bus bars are conveyed in the collected state such that flat surfaces thereof face each other, and thus, it is desirable to prevent an unnecessary load from being applied during conveyance, and accordingly, it is possible to improve yield.

SUMMARY OF THE INVENTION a purpose of the present invention is to provide a wire connection bus bar and a conductive module with excellent yield.

According to an aspect of the present invention, a wire connection bus bar includes a conductive bus bar member that is electrically connected to at least one electrode terminal of a battery module in which a plurality of battery cells having respective positive and negative electrode terminals are arranged, and a conductive connecting terminal that has a first terminal portion physically and electrically connected to the bus bar member, and a second terminal portion physically and electrically connected to an electric wire configured for electrical connection between the bus bar member and an electrical connection target. The bus bar member includes a flat plate-shaped bus bar main body electrically connected to the electrode terminal, an arm body that is a part extending from the bus bar main body in a direction crossing a reference plane of the bus bar main body and has an electrical connection portion to which the first terminal portion is physically and electrically connected, and at least one protruding body protruding from the bus bar main body in the direction crossing the reference plane, and the protruding body is formed such that a protruding amount from the reference plane in an orthogonal direction with respect to the reference plane is equal to or larger than a maximum protruding amount from the reference plane of a connection body, formed of the arm body and the connecting terminal, in the orthogonal direction when viewed along the reference plane.

According to another aspect of the present invention, in the wire connection bus bar, when the protruding body is provided at a plurality of locations, two of the protruding bodies may be arranged such that the connection body formed of the arm body and the connecting terminal is interposed therebetween.

According to still another aspect of the present invention, in the wire connection bus bar, the second terminal portion may have at least one set of two barrel pieces to be crimped to an end portion of the electric wire.

According to still another aspect of the present invention, a conductive module includes a conductive bus bar member that is electrically connected to at least one electrode terminal of a battery module in which a plurality of battery cells having the respective positive and negative electrode terminals are arranged, and an electric wire extending in an arrangement direction of the plurality of battery cells and electrically connecting the bus bar member and an electrical connection target, a conductive connecting terminal that has a first terminal portion physically and electrically connected to the bus bar member, and a second terminal portion physically and electrically connected to the electric wire; and a housing member housing the bus bar member, the electric wire, and the connecting terminal. The bus bar member includes a flat plate-shaped bus bar main body electrically connected to the electrode terminal, an arm body that is a part extending from the bus bar main body in a direction crossing a reference plane of the bus bar main body and has an electrical connection portion to which the first terminal portion is physically and electrically connected, and at least one protruding body protruding from the bus bar main body in the direction crossing the reference plane, and the protruding body is formed such that a protruding amount from the reference plane in an orthogonal direction with respect to the reference plane is equal to or larger than a maximum protruding amount from the reference plane of a connection body, formed of the arm body and the connecting terminal, in the orthogonal direction when viewed along the reference plane.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a wire connection bus bar and a conductive module according to the present invention will be described in detail with reference to the drawings. Incidentally, the present invention is not limited by the present embodiment.

Embodiment

One of embodiments of the wire connection bus bar and conductive module according to the present invention will be described with reference to FIGS. 1 to 11.

Figure 1:
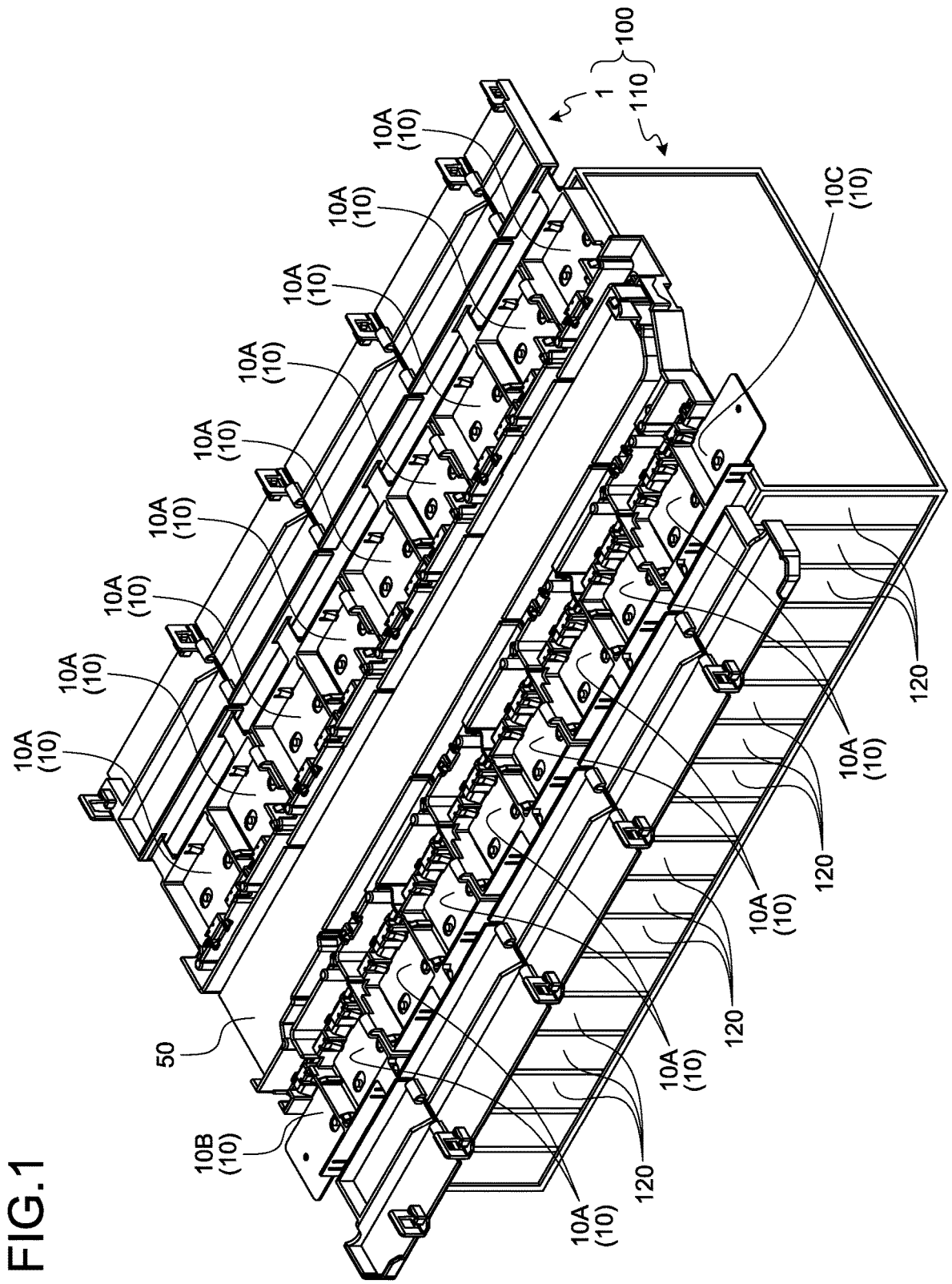
FIG. 1 is a perspective view illustrating a wire connection bus bar and a conductive module according to an embodiment, and is the view illustrating the state of being attached to a battery module.
Figure 2:
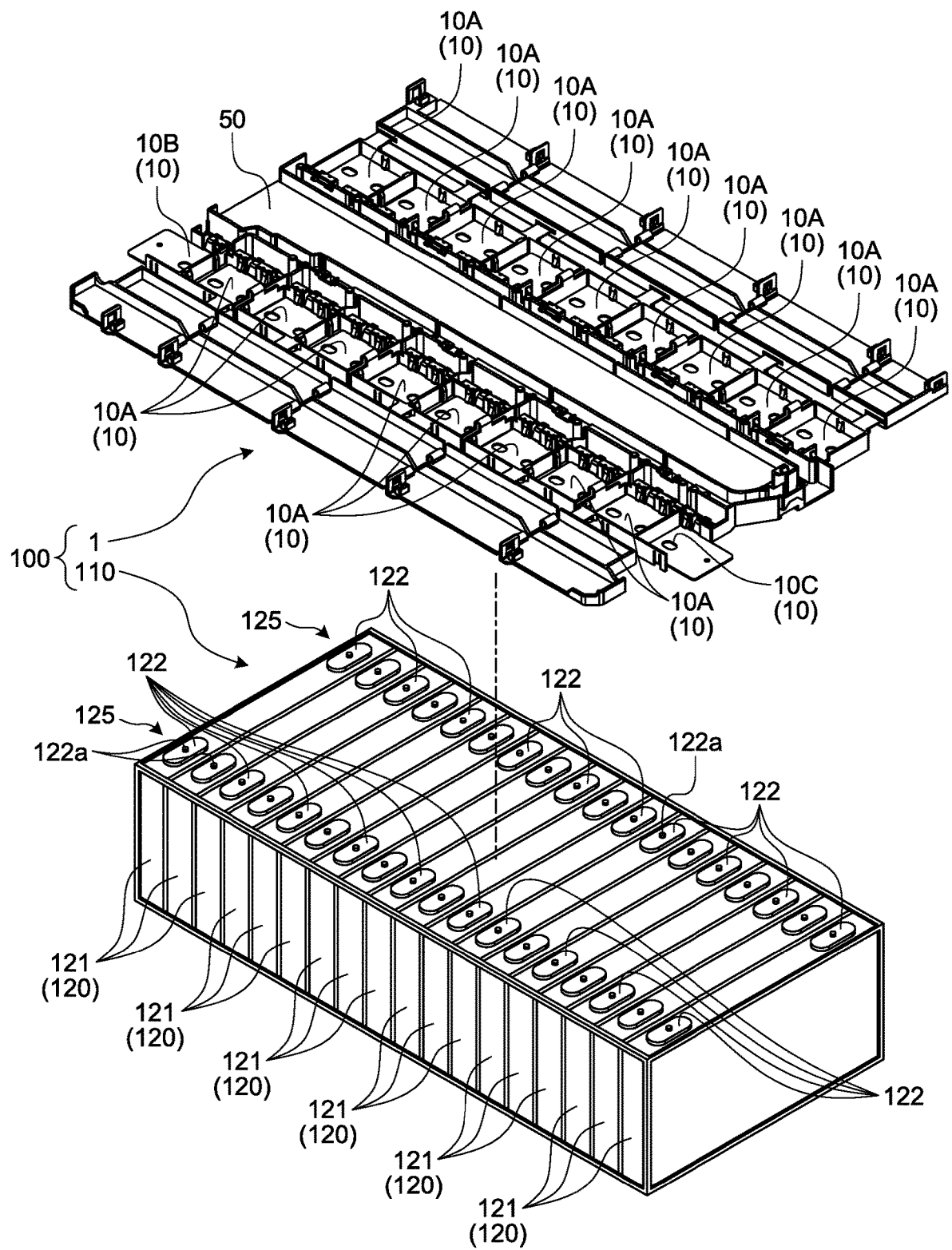
FIG. 2 is a perspective view illustrating the wire connection bus bar and the conductive module according to the embodiment together with the battery module.

In FIGS. 1 and 2, reference numeral 1 represents the conductive module according to this embodiment. In addition, reference numeral 10 in FIGS. 1 and 2 represents the wire connection bus bar according to this embodiment. The conductive module 1 is electrically connected to at least one of a plurality of battery cells 120 forming a battery module 110, and forms a battery pack 100 together with the battery module 110. The battery pack 100 is mounted in a vehicle (an electric automobile, a hybrid car, or the like) having a rotary machine as a driving source, and is used for supply of electric power to the rotary machine or the like. First, a connection target of the conductive module 1 will be described.

The battery cell 120 includes a cell body 121 and two electrode terminals 122 (FIG. 2). Each of the electrode terminals 122 is provided at any place of the cell body 121 in the state of being exposed to the outside, one of which serves as a positive electrode and the other of which serves as a negative electrode. Each of the electrode terminals 122 is, for example, a plate-shaped terminal provided on an outer wall face of the cell body 121, or a columnar pole protruding from the outer wall face of the cell body 121. When the cell body 121 has a plurality of the outer wall faces in the battery cells 120, each of the electrode terminals 122 may be arranged on one outer wall face, or the outer wall faces on which the electrode terminals 122 are arranged may be divided for each of the electrode terminals 122. In the battery module 110, the respective battery cells 120 are arranged in series in a state where the electrode terminals 122 of any one of battery cells 120 are aligned in a row and the other electrode terminals 122 are also aligned in a row. Thus, an electrode terminal group 125 formed of the electrode terminals 122 aligned in a row is provided at two points in the battery module 110.

In this battery module 110, the two electrode terminals 122, adjacent to each other in an arrangement direction of the battery cells 120, are electrically connected to each of the electrode terminal groups 125. Further, there are two electrode terminals 122, which are not electrically connected to the other electrode terminals 122, among all the electrode terminals 122 of the battery module 110. One of these two independent electrode terminals 122 serves as a so-called total positive electrode, and the other one serves as a so-called total negative electrode.

For example, the cell body 121 forms a rectangular parallelepiped in the battery cell 120 of the present embodiment. Therefore, the battery module 110 of the present embodiment virtually forms a rectangular parallelepiped with an aggregate of the plurality of arranged battery cells 120, and has six wall faces. In addition, the positive and negative electrode terminals 122 are arranged on one outer wall face in the battery cell 120 of the present embodiment. Accordingly, the battery module 110 of the present embodiment is provided with the two electrode terminal groups 125 on one of the six wall faces forming the rectangular parallelepiped. In addition, the positive and negative electrode terminals 122 are formed in a plate shape in the battery cell 120 of the present embodiment.

Incidentally, the electrode terminal 122 is provided with a protrusion 122a serving as a positioning guide at the time of connecting the wire connection bus bar 10 (FIG. 2). The protrusion 122a is a columnar body protruding from an exposure plane of the electrode terminal 122 (a plane to which the wire connection bus bar 10 is connected as will be described later), and may be provided in all the electrode terminals 122 or in a specific electrode terminal 122. In the former case, all of the protrusions 122a may have the same shape, and for example, the positive electrode terminal 122 and the negative electrode terminal 122 may have different shapes. In addition, in the latter case, for example, the protrusion 122a is provided only in any one of the positive electrode terminal 122 and the negative electrode terminal 122. In this example, all the electrode terminals 122 are provided with the protrusions 122a having the same shape.

The conductive module 1 of the present embodiment is connected to at least one of the respective electrode terminal groups 125 with respect to the battery module 110 configured in this manner. The conductive module 1 in this example is configured to be electrically connected to each of both the electrode terminal groups 125.

Figure 5:
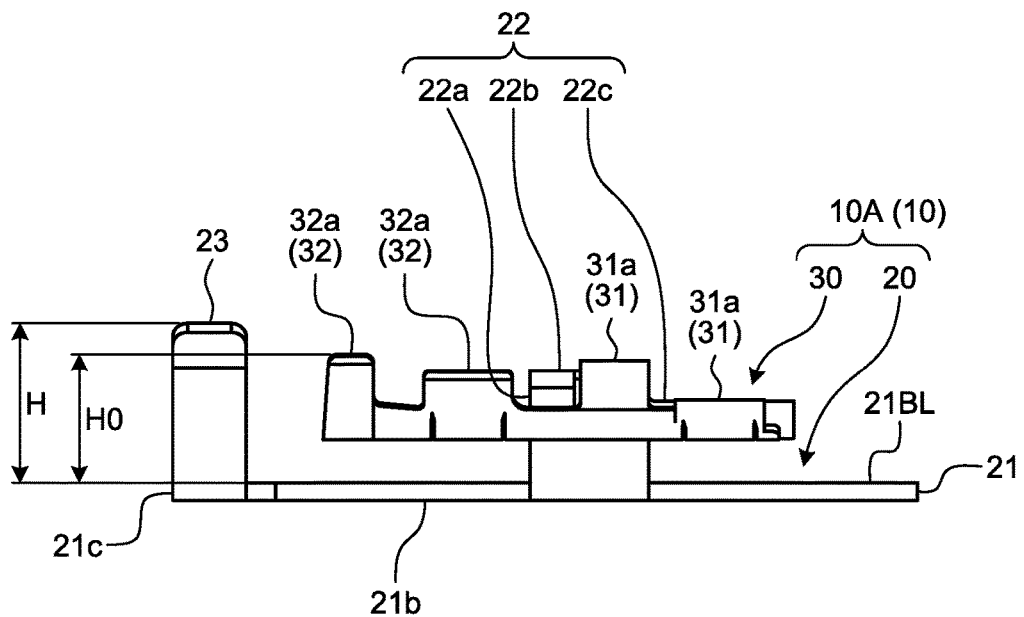
FIG. 5 is a rear view of the wire connection bus bar.
Figure 6:
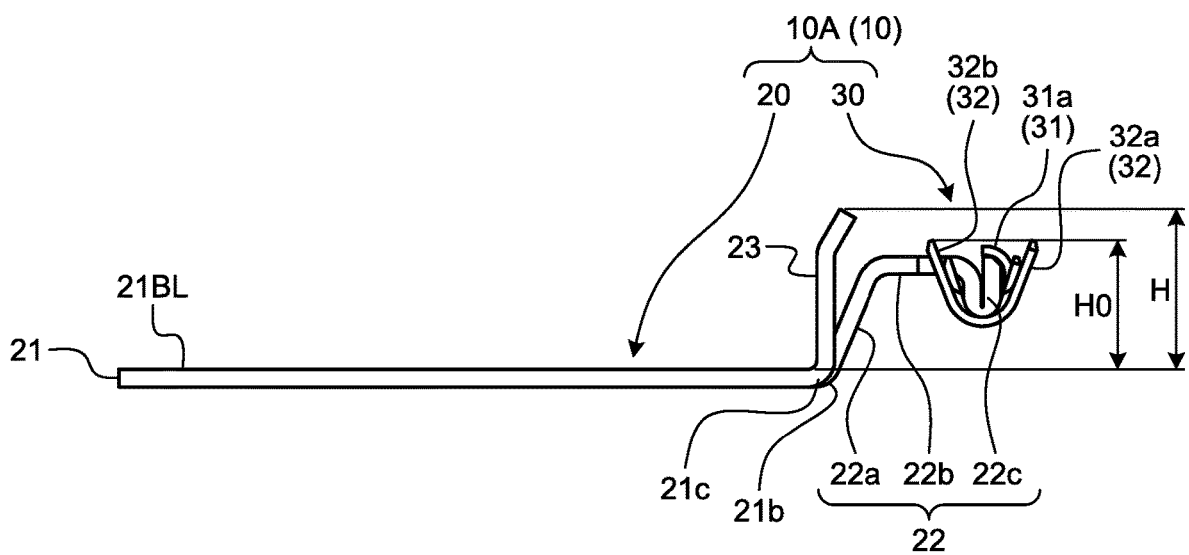
FIG. 6 is a side view of the wire connection bus bar.
Figure 7:
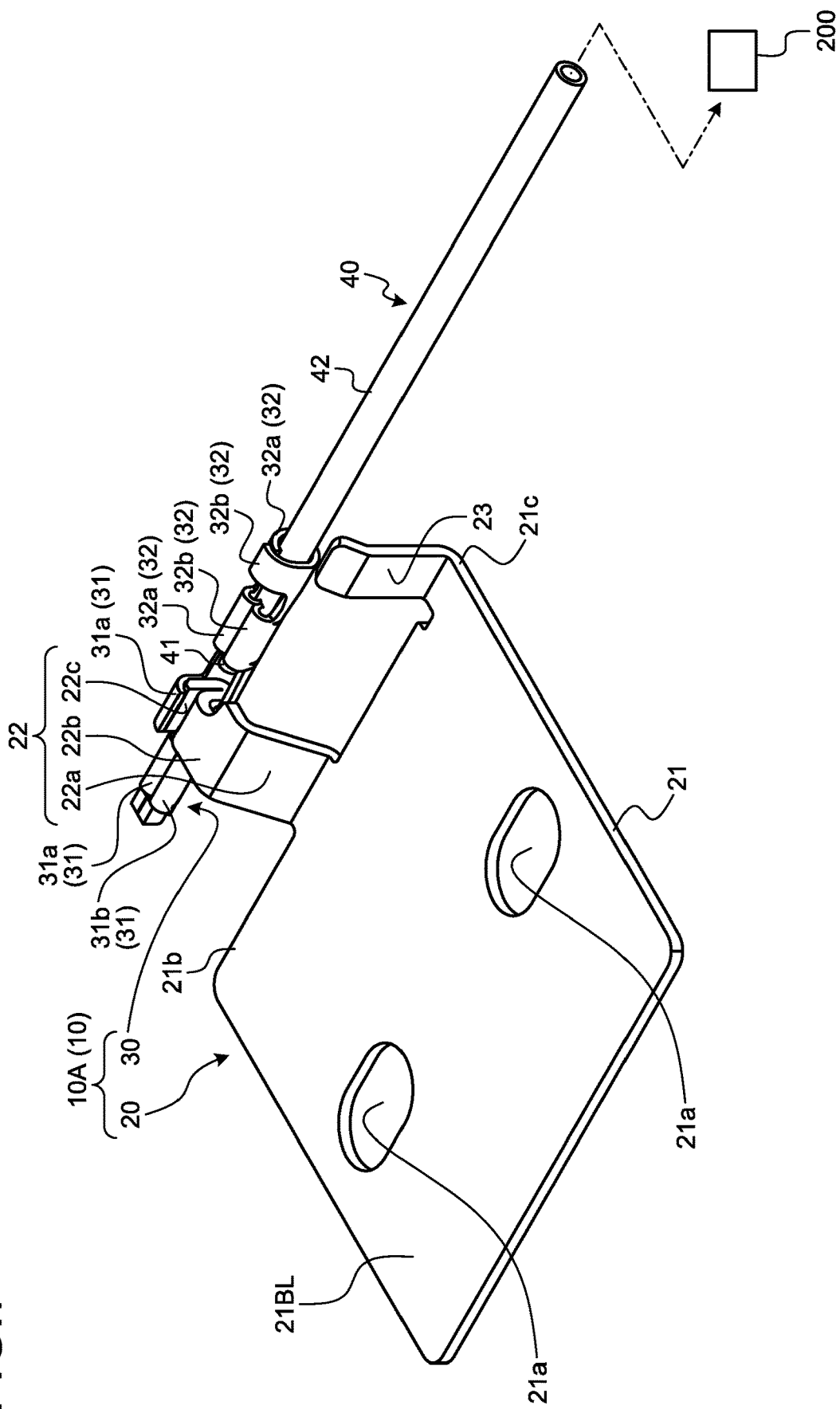
FIG. 7 is a perspective view of the wire connection bus bar to which an electric wire is connected.

The conductive module 1 includes the wire connection bus bar 10 (FIGS. 1 to 7). The wire connection bus bar 10 includes a bus bar member 20 and a connecting terminal 30 (FIGS. 3 to 7). Further, the conductive module 1 includes an electric wire 40 forming a pair with the wire connection bus bar 10 (FIG. 7). In addition, the conductive module 1 further includes a housing member 50 in which the wire connection bus bar 10 and the electric wire 40 are housed (FIGS. 1 and 2). This conductive module 1 is provided with at least one set of a combination of the pair of wire connection bus bar 10 and electric wire 40 electrically connected to each other. In this example, a plurality of sets of the combinations are provided for each of the electrode terminal groups 125.

The wire connection bus bar 10 has conductivity and is electrically connected to at least one electrode terminal 122 of the battery module 110 and is electrically connected to the electric wire 40 forming a pair. In the wire connection bus bar 10, the conductive bus bar member 20 takes charge of electrical connection with respect to the electrode terminal 122, and the conductive connecting terminal 30 takes charge of electrical connection with respect to the electric wire 40. In this wire connection bus bar 10, each of the bus bar member 20 and the connecting terminal 30 is molded using a conductive material such as metal. The bus bar member 20 and the connecting terminal 30 may be molded using the same conductive material or may be molded using different kinds of conductive materials. For example, the conductive material used for each of the bus bar member 20 and the connecting terminal 30 may be determined on consideration of cost, a shape, and the like. Aluminum, an aluminum alloy, copper, a copper alloy, or the like is conceivable as the conductive material to be used, for example.

The bus bar member 20 is electrically connected to at least one electrode terminal 122 of the battery module 110, and a shape thereof is determined in accordance with the number and shape of the electrode terminals 122 serving as connection targets, arrangement on the battery module 110, and the like. For example, when the electrode terminal 122 has a plate shape, the bus bar member 20 is formed so as to be physically and electrically connected to the electrode terminal 122 by welding (laser welding, ultrasonic welding, resistance welding, or the like). In addition, when the electrode terminal 122 is an electrode pole, the electrode terminal 122 is formed in a stud bolt shape, and a through hole through which the electrode terminal 122 is inserted is formed in the bus bar member 20. In this case, the bus bar member 20 and the electrode terminal 122 are physically and electrically connected to each other by screwing a female screw member to the electrode terminal 122.

The connecting terminal 30 is physically and electrically connected to the bus bar member 20 and is physically and electrically connected to the electric wire 40. The connecting terminal 30 may be physically connected to the bus bar member 20 by any method. For example, the connecting terminal 30 may be fixed to the bus bar member 20 by crimping, or may be fixed to the bus bar member 20 by welding (laser welding or the like). In addition, the connecting terminal 30 may be physically connected to the electric wire 40 by any method. For example, the connecting terminal 30 may be fixed to the electric wire 40 by crimping, or may be fixed to the electric wire 40 by welding or brazing.

Here, the conductive module 1 of the present embodiment includes a bus bar that electrically connects two electrode terminals 122 adjacent to each other in the arrangement direction of the battery cells 120 (hereinafter referred to as a "wire connection bus bar 10A"), a bus bar that is electrically connected to the total positive electrode (hereinafter referred to as a "wire connection bus bar 10B"), and a bus bar that is electrically connected to the total negative electrode (hereinafter referred to as a "wire connection bus bar 10C") as the wire connection bus bar 10 (FIGS. 1 and 2). Although the respective wire connection bus bars 10A, 10B, and 10C differ in shape depending on the number of the electrode terminals 122 to be connected and the arrangement thereof on the battery module 110, there is no difference in terms that the bus bar member 20 has a bus bar main body 21 and an arm body 22 (FIG. 3 to FIG. 7). Accordingly, the wire connection bus bar 10 will be described hereinafter by exemplifying the wire connection bus bar 10A.

The bus bar member 20 in this example is press-molded into the following shape using a plate-shaped aluminum as a base material.

Figure 3:
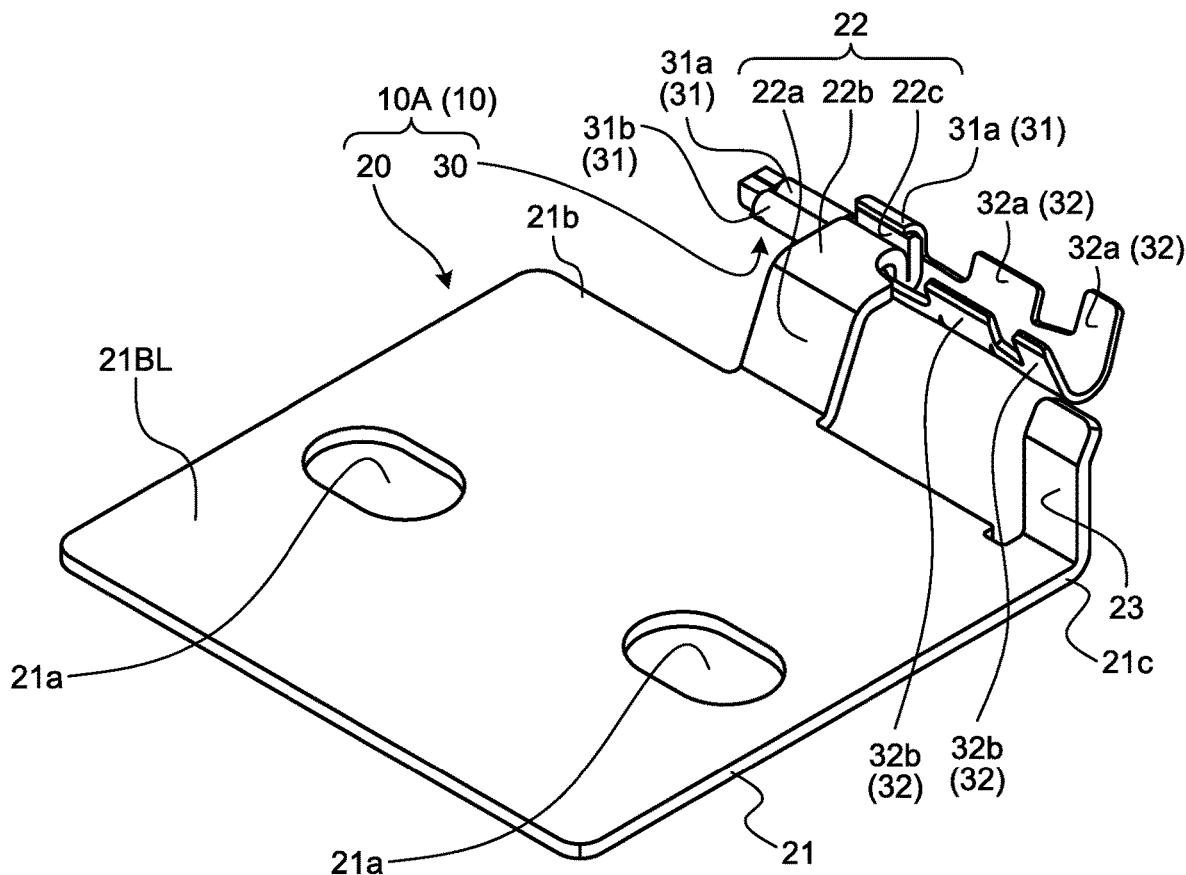
FIG. 3 is a perspective view of the wire connection bus bar.

The bus bar member 20 has the bus bar main body 21 having a flat plate shape and electrically connected to the electrode terminal 122 (FIGS. 3 to 7). The bus bar main body 21 in this example is formed in a rectangular flat plate shape and is welded to the two electrode terminals 122 adjacent to each other in the arrangement direction of the battery cells 120. Here, the electrode terminal 122 is provided with the protrusion 122a as described above. Accordingly, a through hole 21a, configured to avoid the protrusions 122a of the two electrode terminals 122, is formed for each of the protrusions 122a in the bus bar main body 21 in this example (FIG. 3).

In addition, the bus bar member 20 has the arm body 22 to which the connecting terminal 30 is physically and electrically connected (FIGS. 3 to 7). The arm body 22 is a part that is extended from the bus bar main body 21 in a direction crossing a reference plane 21BL of the bus bar main body 21. The arm body 22 in this example is extended from any one of four side portions of the rectangular bus bar main body 21 so as to protrude from the reference plane 21BL. Here, the arm body 22 is extended from one side portion (a side portion 21b) of two side portions that are positioned in the crossing direction with respect to the arrangement direction of the two electrode terminals 122 as connection targets (see FIGS. 3 and 5 to 7).

Specifically, the arm body 22 in this example has a first piece portion 22a having a piece shape that is erected from the side portion 21b so as to protrude from the reference plane 21BL, a second piece portion 22b having a piece shape that is extended from an end portion of the first piece portion 22a on a protruding direction side, and an electrical connection portion 22c that is provided at an end portion of the second piece portion 22b on an extending direction side (FIGS. 3 and 5 to 7). The second piece portion 22b has a plane parallel to a virtual plane including the reference plane 21BL. The electrical connection portion 22c is a part to which a first terminal portion 31, which will be described later, of the connecting terminal 30 is physically and electrically connected. The electrical connection portion 22c in this example is formed by superimposing two pieces folded by press molding on each other, and is extended in the arrangement direction of the two electrode terminals 122 serving as connection targets of the bus bar member 20. The electrical connection portion 22c is crimped so as to be sandwiched by the first terminal portions 31. The arm body 22 in this example is extended from substantially the center of the side portion 21b.

Figure 4:
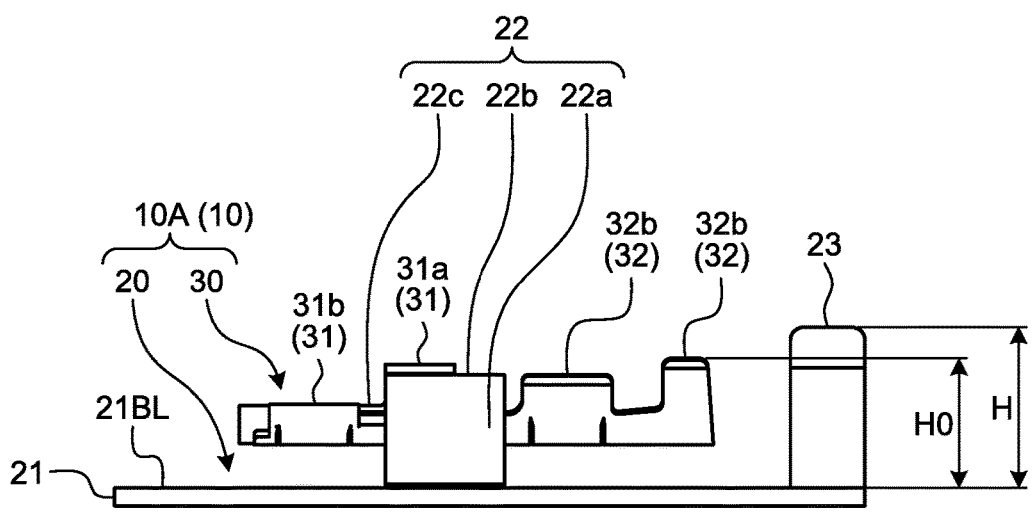
FIG. 4 is a front view of the wire connection bus bar.

Here, the bus bar member 20 for the wire connection bus bar 10A has at least one protruding body 23 protruding from the bus bar main body 21 in the direction crossing the reference plane 21BL (FIGS. 3 to 7). When viewed along the reference plane 21BL, the protruding body 23 is formed such that a protruding amount H from the reference plane 21BL in an orthogonal direction with respect to the reference plane 21BL is equal to or larger than a maximum protruding amount HO from the reference plane 21BL of a connection body, formed of the arm body 22 and the connecting terminal 30, in the orthogonal direction (FIGS. 4 to 6). The protruding body 23 in this example is formed in a piece shape and is erected from the same side portion 21b as the arm body 22 so as to protrude from the reference plane 21BL. Here, the protruding amount H of the protruding body 23 is made larger than the maximum protruding amount HO of the connection body. In addition, here, the protruding body 23 is provided to be closer to a second terminal portion 32, which will be described later, of the connecting terminal 30 than the substantially center of the side portion 21b and to be closer to a corner portion 21c of the bus bar main body 21 than the second terminal portion 32 (FIG. 3).

The connecting terminal 30 has the first terminal portion 31 physically and electrically connected to the bus bar member 20 and the second terminal portion 32 physically and electrically connected to the electric wire 40 (FIGS. 3 to 8). The first terminal portion 31 in this example is formed as a crimping portion to be crimped to the electrical connection portion 22c of the bus bar member 20. In addition, the second terminal portion 32 in this example is formed as a crimping portion to be crimped to an end portion of the electric wire 40. The connecting terminal 30 in this example has the first terminal portion 31 and the second terminal portion 32 arranged on the same axis, and is attached to the electrical connection portion 22c such that this axis is set along the arrangement direction of the two electrode terminals 122 serving as connection targets of the bus bar member 20.

Figure 8:
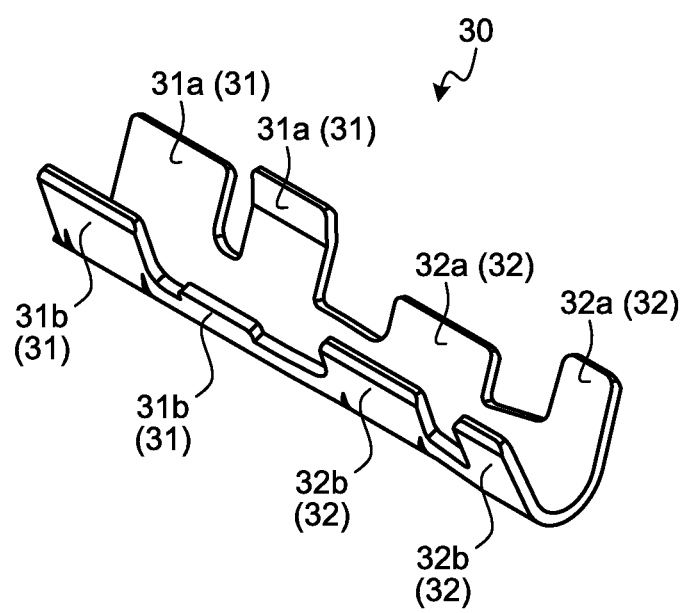
FIG. 8 is a perspective view of a connecting terminal.

The first terminal portion 31 in this example has at least one set of two barrel pieces 31a and 31b which have piece shapes and are arranged to oppose each other (FIGS. 3, 7, and 8). The respective barrel pieces 31a and 31b are crimped to the electrical connection portion 22c by caulking while sandwiching the electrical connection portion 22c. Here, two sets of combinations of the pair of barrel pieces 31a and 31b are provided. The respective combinations are arranged side by side along the arrangement direction of the two electrode terminals 122 as connection targets of the bus bar member 20. In one combination of the barrel pieces 31a and 31b, the other barrel piece 31b is made shorter than the one barrel piece 31a in order to avoid the second piece portion 22b. In addition, the barrel pieces 31a and 31b are formed to have the same length in the other combination of the barrel pieces 31a and 31b.

The second terminal portion 32 in this example has at least one set of two barrel pieces 32a and 32b which have piece shapes and are arranged to oppose each other (FIGS. 3, 7, and 8). The respective barrel pieces 32a and 32b are crimped to the end portion of the electric wire 40 by caulking while sandwiching the end portion of the electric wire 40. Here, two sets of combinations of the pair of barrel pieces 32a and 32b are provided. The respective combinations are arranged side by side along the arrangement direction of the two electrode terminals 122 as connection targets of the bus bar member 20. In addition, these combinations are also arranged side by side along the arrangement direction of the electrode terminals 122 to correspond to the respective combinations of the barrel pieces 31a and 31b of the first terminal portion 31. One combination of the barrel pieces 32a and 32b is crimped to a core electric wire 41 exposed from the end portion of the electric wire 40. The other combination of the barrel pieces 32a and 32b is crimped to a cover 42 of the end portion of the electric wire 40 (FIG. 7). In both the combinations, the respective barrel pieces 32a and 32b are formed to have the same length for each pair.

In this manner, the connecting terminal 30 of the present embodiment is crimped to the electrical connection portion 22c and the electric wire 40, and thus, requires a spring property in order to continuously maintain a crimping force thereof. Accordingly, the connecting terminal 30 of the present embodiment is press-molded using a plate material, made of a copper alloy and having a high elastic limit, as a base material.

The electric wire 40 is used for electrical connection between the bus bar member 20 and an electrical connection target 200 (FIG. 7). The electric wire 40 is extended in the arrangement direction of the plurality of battery cells 120 in the battery pack 100. The electrical connection target 200 is, for example, a battery monitoring unit that monitors a battery state (voltage, current, temperature, or the like) of the battery cell 120. Accordingly, the electric wire 40 is provided as a voltage detection line configured to detect a voltage of the battery cell 120.

Figure 9:
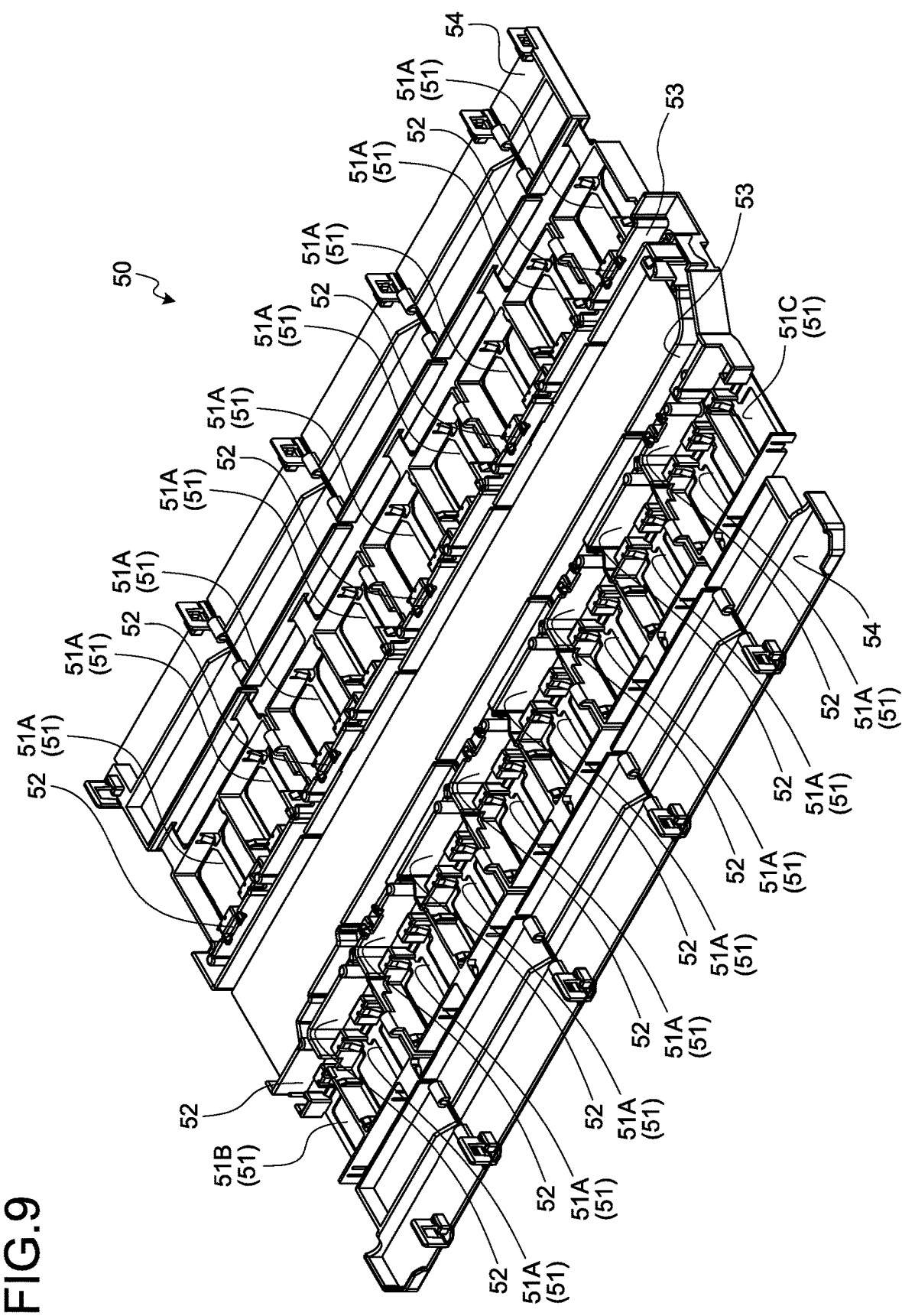
FIG. 9 is a perspective view of a housing member.

The housing member 50 is formed using an insulating material such as synthetic resin. The wire connection bus bar 10 (the bus bar member 20 and the connecting terminal 30) and the electric wire 40 are housed in the housing member 50. The housing member 50 in this example includes a bus bar housing chamber 51 in which the bus bar member 20 is housed, a terminal housing chamber 52 in which the connecting terminal 30 and the end portions of the electric wire 40 are housed, and a wire housing chamber 53 in which the electric wire 40 is housed, for each of the electrode terminal groups 125 (FIG. 9).

The housing member 50 in this example has a first bus bar housing chamber 51A, a second bus bar housing chamber 51B, and a third bus bar housing chamber 51C as the bus bar housing chamber 51 on the one electrode terminal group 125 side. The first bus bar housing chamber 51A is a chamber in which the bus bar member 20 of the wire connection bus bar 10A is housed. The first bus bar housing chamber 51A is formed for each of the wire connection bus bars 10A. The second bus bar housing chamber 51B is a chamber in which the bus bar member 20 of the wire connection bus bar 10B is housed. The third bus bar housing chamber 51C is a chamber in which the bus bar member 20 of the wire connection bus bar 10C is housed. The single second bus bar housing chamber 51B and the single third bus bar housing chamber 51C are formed. In addition, the housing member 50 in this example has the first bus bar housing chamber 51A for each of the wire connection bus bars 10A as the bus bar housing chamber 51 on the other electrode terminal group 125 side.

The terminal housing chamber 52 is provided for each of the connecting terminals 30 of the wire connection bus bar 10A on the respective electrode terminal groups 125 side. The connecting terminal 30 of the wire connection bus bar 10A and an end portion of the electric wire 40 connected to this connecting terminal 30 are housed in the terminal housing chamber 52. In addition, the terminal housing chamber 52 housing the connecting terminal 30 of the wire connection bus bar 10B and an end portion of the electric wire 40 connected to this connecting terminal 30 is provided on the one electrode terminal group 125 side. Meanwhile, the connecting terminal 30 of the wire connection bus bar 10C is housed in the terminal housing chamber 52 for the adjacent wire connection bus bar 10A.

The wire housing chambers 53 are provided one by one for each of the electrode terminal groups 125. The electric wire 40 led out from the connecting terminal 30 is housed in the wire housing chamber 53. In the wire housing chamber 53 on the one electrode terminal group 125 side, the electric wires 40 electrically connected, respectively, to the electrode terminals 122 of this electrode terminal group 125 are housed. In addition, the wire housing chamber 53 on the other electrode terminal group 125 side, the electric wires 40 electrically connected, respectively, to the electrode terminals 122 of this electrode terminal group 125 are housed.

The housing member 50 in this example is provided with a lid body 54, which closes each opening (housing port) of the bus bar housing chamber 51, the terminal housing chamber 52, and the wire housing chamber 53, for each of the electrode terminal groups 125 (FIG. 9).

In this conductive module 1, the connecting terminal 30 is attached to the bus bar member 20 to form the wire connection bus bar 10. The wire connection bus bars 10A may be shared by the respective electrode terminal groups 125. In addition, two kinds of the wire connection bus bars 10A in which directions of attachment of the connecting terminals 30 (in other words, leading-out directions of the electric wires 40) are set to opposite directions may be prepared for the respective electrode terminal groups 125. In this conductive module 1, the end portion of the electric wire 40 is connected to the connecting terminal 30 after the wire connection bus bar 10 is formed. In this conductive module 1, for example, all the wire connection bus bars 10 with the electric wires 40 are housed in the housing member 50 after arranging the housing member 50 in the battery module 110, and the respective electric wires 40 are wired along the wire housing chamber 53. The respective bus bar members 20 are welded to the electrode terminals 122. In this conductive module 1, the lid body 54 of the housing member 50 is closed through these steps.

Figure 10:
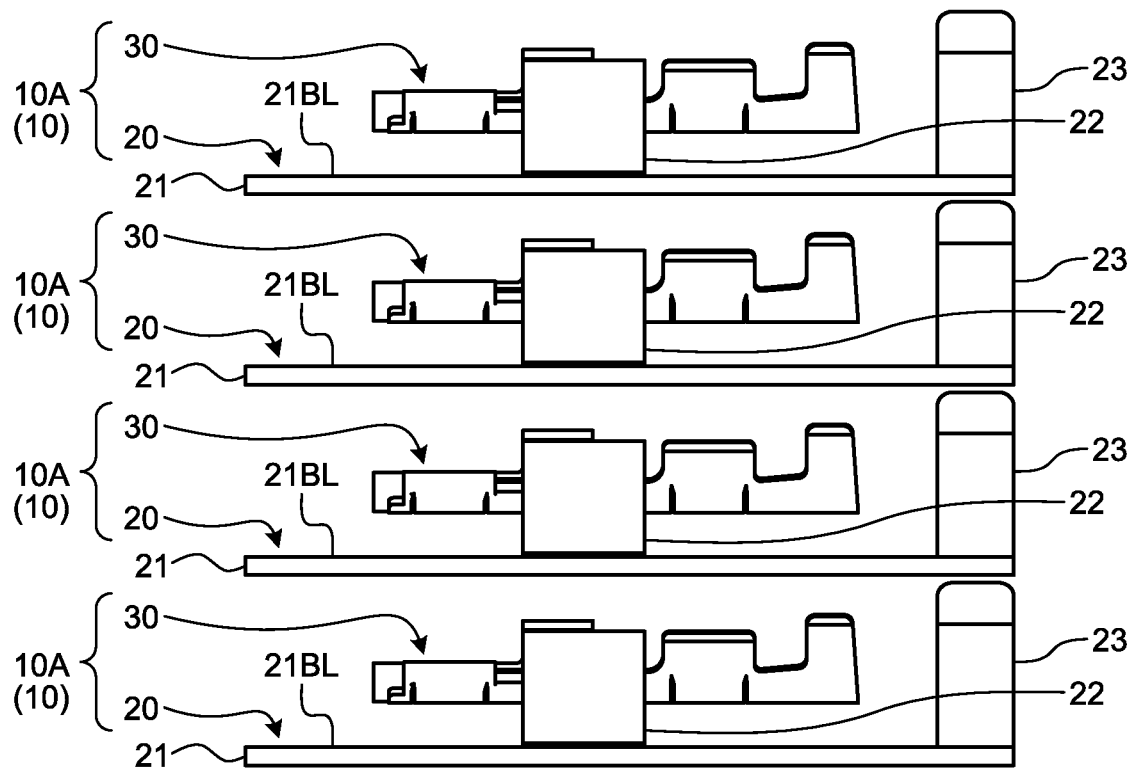
FIG. 10 is a view illustrating an example of a conveyance state of the wire connection bus bar.

Since the conductive module 1 is attached to the battery module 110 after these steps, a step of conveying the wire connection bus bar 10 is provided between a step of forming the wire connection bus bar 10 and a step of connecting the electric wire 40 to the connecting terminal 30. In the conveying process, the plurality of wire connection bus bars 10 are superimposed on each other with the planes of the bus bar main body 21 facing each other (FIG. 10), and thus, a larger load is applied to the wire connection bus bar 10 on the lower side if a stacking direction thereof is set to be along the vertical direction. In FIG. 10, the wire connection bus bar 10A is exemplified.

However, the wire connection bus bar 10 of the present embodiment is provided with the above-described protruding body 23, and can receive the load from the adjacent wire connection bus bar 10 using the protruding body 23 during conveyance. In addition, even when the adjacent wire connection bus bar 10 contacts the arm body 22 or the connecting terminal 30 during conveyance, this wire connection bus bar 10 of the present embodiment can receive the load from the adjacent wire connection bus bar 10 using the protruding body 23 together with the arm body 22 and the connecting terminal 30. That is, the wire connection bus bar 10 can distribute the load from the adjacent wire connection bus bar 10 to the arm body 22 or the connecting terminal 30, and the protruding body 23. In this manner, in any case, the load applied to the arm body 22 and the connecting terminal 30 during conveyance can be mitigated in the wire connection bus bar 10 of the present embodiment. Accordingly, the wire connection bus bar 10 of the present embodiment can keep shapes of the arm body 22 and the connecting terminal 30 in original shapes before being conveyed, even after the conveyance is completed. Therefore, the wire connection bus bar 10 of the present embodiment can improve yield as compared with a wire connection bus bar that does not have the protruding body 23. In addition, the conductive module 1 of the present embodiment includes the wire connection bus bar 10, and the same effect as the wire connection bus bar 10 can be obtained.

Figure 11:
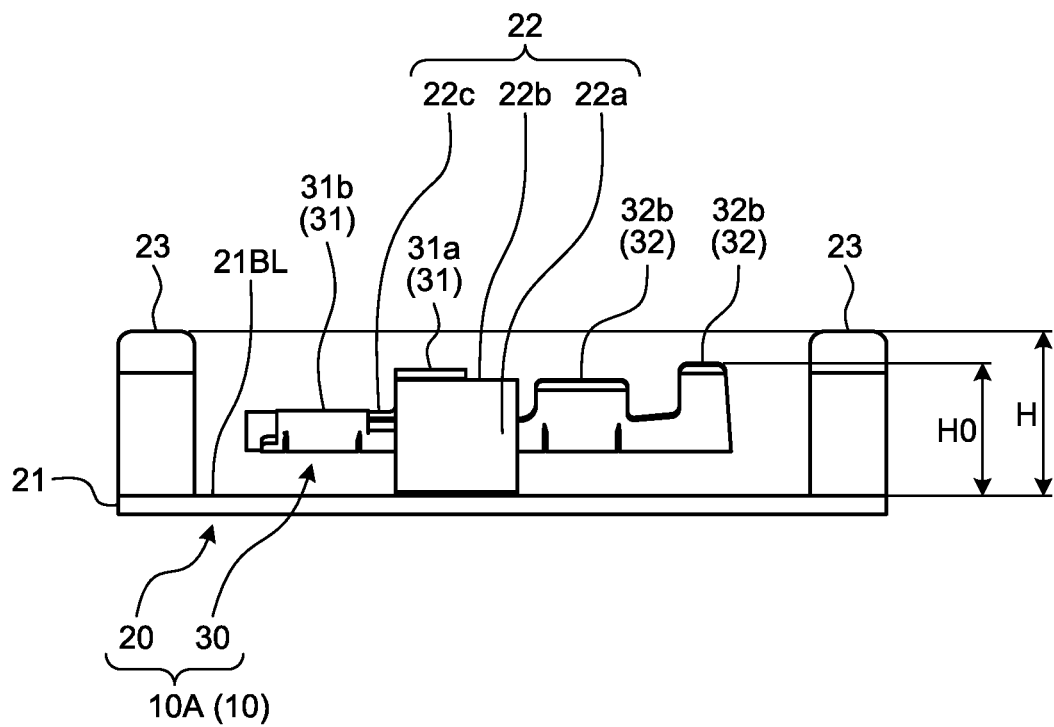
FIG. 11 is a perspective view illustrating a modification of the wire connection bus bar.

Meanwhile, the wire connection bus bar 10 of the present embodiment may be provided with the protruding bodies 23 at a plurality of locations. In the case of providing the protruding bodies 23 at the plurality of locations, it is desirable to arrange each of the two protruding bodies 23 on the side portion 21b such that the connection body formed of the arm body 22 and the connecting terminal 30 is interposed therebetween (FIG. 11). It is desirable to set the protruding amount H of each of the two protruding bodies 23 to be larger than the maximum protruding amount HO of the connection body. Since the wire connection bus bar 10 can reduce the possibility of contact of the adjacent wire connection bus bar 10 with respect to the arm body 22 and the connecting terminal 30 by the arrangement of the two protruding bodies 23 and the setting of the protruding amount H, the yield can be further improved.

As described above, it is possible to obtain the wire connection bus bar 10 and the conductive module 1 with the excellent yield by providing the protruding body 23 on the wire connection bus bar 10 in the present embodiment.

The wire connection bus bar according to the embodiment is provided with a protruding body and can receive a load from an adjacent wire connection bus bar using this protruding body. In addition, even when the adjacent wire connection bus bar contacts an arm body or a connecting terminal during conveyance, this wire connection bus bar can receive the load from the adjacent wire connection bus bar using the protruding body together with the arm body and the connecting terminal. That is, the wire connection bus bar can distribute the load from the adjacent wire connection bus bar to the arm body, the connecting terminal, and the protruding body. In this manner, in any case, the load applied to the arm body and the connecting terminal during conveyance can be mitigated in this wire connection bus bar. Accordingly, the wire connection bus bar can keep shapes of the arm body and the connecting terminal in original shapes before being conveyed, even after the conveyance is completed. Therefore, the wire connection bus bar according to the present invention can improve the yield as compared with a wire connection bus bar having no protruding body. In addition, the conductive module according to the present invention includes the wire connection bus bar, and the same effect as the wire connection bus bar can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire connection bus bar comprising:
    a conductive bus bar member that is electrically connected to at least one electrode terminal of a battery module in which a plurality of battery cells having respective positive and negative electrode terminals are arranged; and
    a conductive connecting terminal that has a first terminal portion physically and electrically connected to the bus bar member, and a second terminal portion physically and electrically connected to an electric wire configured for electrical connection between the bus bar member and an electrical connection target, wherein
    the bus bar member includes a flat plate-shaped bus bar main body electrically connected to the electrode terminal, an arm body that is a part extending from the bus bar main body in a direction crossing a reference plane of the bus bar main body and has an electrical connection portion to which the first terminal portion is physically and electrically connected, and at least one protruding body protruding from the bus bar main body in the direction crossing the reference plane, and
    the protruding body is spaced away from the arm body and is formed such that a protruding amount from the reference plane in an orthogonal direction with respect to the reference plane is equal to or larger than a maximum protruding amount from the reference plane of a connection body, formed of the arm body and the connecting terminal, in the orthogonal direction when viewed along the reference plane.

2. The wire connection bus bar according to claim 1, wherein
the protruding body is provided at a first location and a second protruding body is provided at a second location, the connection body formed of the arm body and the connecting terminal is interposed between the protruding body and the second protruding body.

3. The wire connection bus bar according to claim 1, wherein
the second terminal portion has at least one set of two barrel pieces to be crimped to an end portion of the electric wire.

4. The wire connection bus bar according to claim 2, wherein
the second terminal portion has at least one set of two barrel pieces to be crimped to an end portion of the electric wire.

5. A conductive module comprising:
a conductive bus bar member that is electrically connected to at least one electrode terminal of a battery module in which a plurality of battery cells having the respective positive and negative electrode terminals are arranged;
an electric wire extending in an arrangement direction of the plurality of battery cells and electrically connecting the bus bar member and an electrical connection target;
a conductive connecting terminal that has a first terminal portion physically and electrically connected to the bus bar member, and a second terminal portion physically and electrically connected to the electric wire; and
a housing member housing the bus bar member, the electric wire, and the connecting terminal, wherein
the bus bar member includes a flat plate-shaped bus bar main body electrically connected to the electrode terminal, an arm body that is a part extending from the bus bar main body in a direction crossing a reference plane of the bus bar main body and has an electrical connection portion to which the first terminal portion is physically and electrically connected, and at least one protruding body protruding from the bus bar main body in the direction crossing the reference plane, and
the protruding body is spaced away from the arm body and is formed such that a protruding amount from the reference plane in an orthogonal direction with respect to the reference plane is equal to or larger than a maximum protruding amount from the reference plane of a connection body, formed of the arm body and the connecting terminal, in the orthogonal direction when viewed along the reference plane.

6. The wire connection bus bar according to claim 1, wherein
the bus bar main body includes a side portion,
the arm body is connected to and extends away from the side portion at a first location, and
the protruding body is connected to and extends away from the side portion at a second location that is spaced away from the first location.

7. The wire connection bus bar according to claim 1, wherein
each of the arm body and the protruding body extend away from the bus bar main body so as to protrude from the reference plane in the same direction.

8. A wire connection bus bar comprising:
a conductive bus bar member that is electrically connected to at least one electrode terminal of a battery module in which a plurality of battery cells having respective positive and negative electrode terminals are arranged; and
a conductive connecting terminal that has a first terminal portion physically and electrically connected to the bus bar member, and a second terminal portion physically and electrically connected to an electric wire configured for electrical connection between the bus bar member and an electrical connection target, wherein
the bus bar member includes a flat plate-shaped bus bar main body electrically connected to the electrode terminal, an arm body that is a part extending from the bus bar main body in a direction crossing a reference plane of the bus bar main body and has an electrical connection portion to which the first terminal portion is physically and electrically connected, and at least one protruding body protruding from the bus bar main body in the direction crossing the reference plane,
the protruding body is formed such that a protruding amount from the reference plane in an orthogonal direction with respect to the reference plane is equal to or larger than a maximum protruding amount from the reference plane of a connection body, formed of the arm body and the connecting terminal, in the orthogonal direction when viewed along the reference plane, and
the protruding body is provided at a first location and a second protruding body is provided at a second location, the connection body formed of the arm body and the connecting terminal is interposed between the protruding body and the second protruding body.

* * * * *